Jan. 31, 1956
R. E. TEWKSBURY
2,732,850
PROPORTIONER
Filed Nov. 23, 1953
3 Sheets-Sheet 1
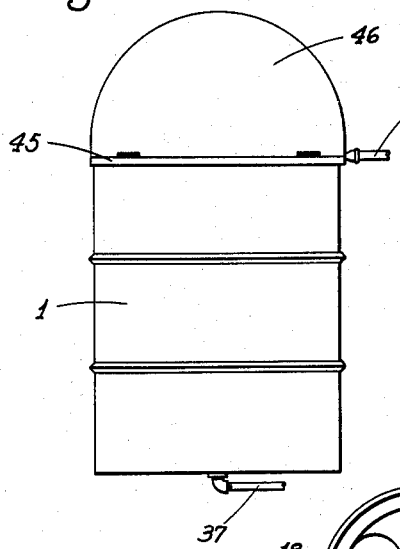
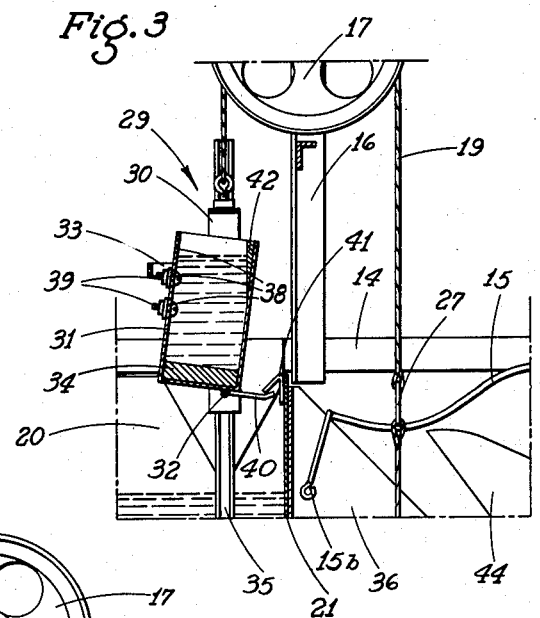
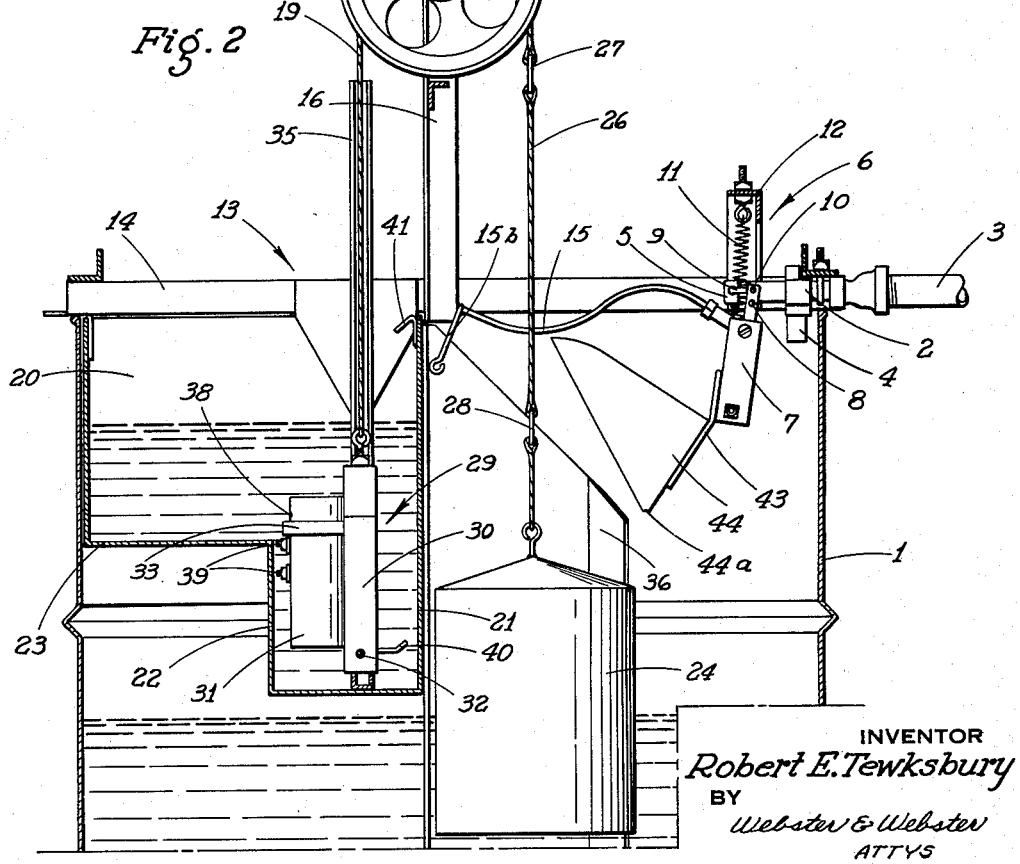
INVENTOR
Robert E. Tewksbury
BY
Webster & Webster
ATTYS Jan. 31, 1956

R. E. TEWKSBURY 2,732,850

PROPORTIONER

Filed Nov. 23, 1953

INVENTOR
Robert E. Tewksbury
BY
Webster & Webster
ATTYS

Jan. 31, 1956 R. E. TEWKSBURY 2,732,850
PROPORTIONER
Filed Nov. 23, 1953 3 Sheets-Sheet 3

INVENTOR
Robert E. Tewksbury
BY
Webster & Webster
ATTYS

United States Patent Office 2,732,850
Patented Jan. 31, 1956

2,732,850
PROPORTIONER
Robert E. Tewksbury, Modesto, Calif.

Application November 23, 1953, Serial No. 393,590

15 Claims. (Cl. 137—87)

This invention is directed to, and it is a major object to provide, a novel apparatus for feeding, in a proportioned amount, an initially separate liquid into a predetermined quantity of another liquid whereby to produce a desired solution or mixture. The invention is especially designed, but not limited, for use to introduce a concentrated liquid disinfectant into feed water for poultry so as to sanitize the water to minimize the outbreak and spread of poultry disease, or to introduce a medicinal liquid into the poultry feed water for the treatment of poultry disease. The apparatus may also be used for water purifying purposes if desired.

Another important object of the present invention is to provide a proportioner for the purpose described which is wholly automatic in its function; the apparatus including a water tank having an outlet from which water is withdrawn for use, and a reservoir for an initially separate liquid disposed immediately adjacent the water tank; there being an elevating bucket device supported for movement between a lowered filling position in the reservoir and a raised emptying position tipped to discharge the contents of the filled elevating bucket device into the water tank.

Still another object of the invention is to provide a proportioner, as in the preceding paragraph, which embodies novel actuating means, including a float in the water tank, operative—automatically—to cause movement of said elevating bucket device between said positions upon, and in response to, vertical movement of the float.

An additional object of the invention is to provide a proportioner, as above, which includes a water supply valve which, when open, delivers water into the tank; and there being novel snap-action mechanism adapted to open and close the valve in response to movement of the float to lowered and raised positions, respectively, in the tank. The elevating bucket device is in lowered filling position in the reservoir when the float is in raised position with the tank filled to a certain level; and in a raised position emptying into the tank when the float is in lowered position with the tank emptied to a lower level.

A further object of the instant invention is to provide a proportioner of the type described which functions smoothly, positively, recurringly, and automatically to introduce a measured amount of the separate liquid from the reservoir into the successive fillings of water in the tank as long as the supply of such liquid lasts; the apparatus being simple in structure, and designed for ease and economy of manufacture and use.

Still another object of the invention is to provide a practical and reliable proportioner, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the water tank with the cover and hood structure thereon; such cover and hood structure enclosing the upper portion of the apparatus, and which is supported by the tank.

Fig. 2 is an enlarged fragmentary sectional elevation showing the apparatus at the start of its cycle of operation; i. e., with the elevating bucket device lowered, the float raised, and the water supply valve closed.

Fig. 3 is an enlarged fragmentary sectional elevation showing mainly the elevating bucket device filled and in raised position, but just before full tipping and emptying of said device.

Figure 4:
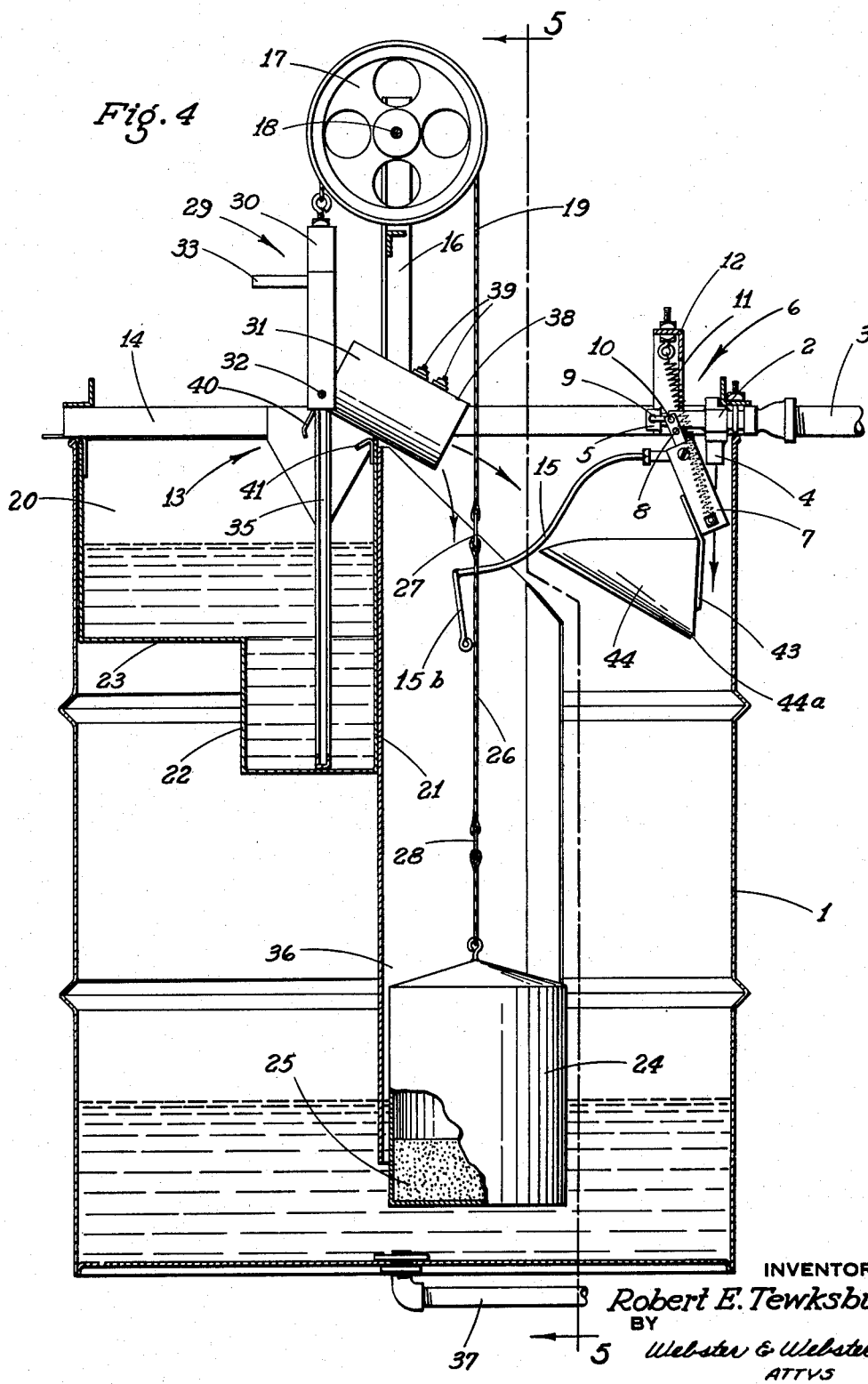
Fig. 4 is an enlarged fragmentary sectional elevation showing the elevating bucket device in its raised, fully tipped position, discharging into the tank; the float being lowered, and the water supply valve open.
Figure 5:
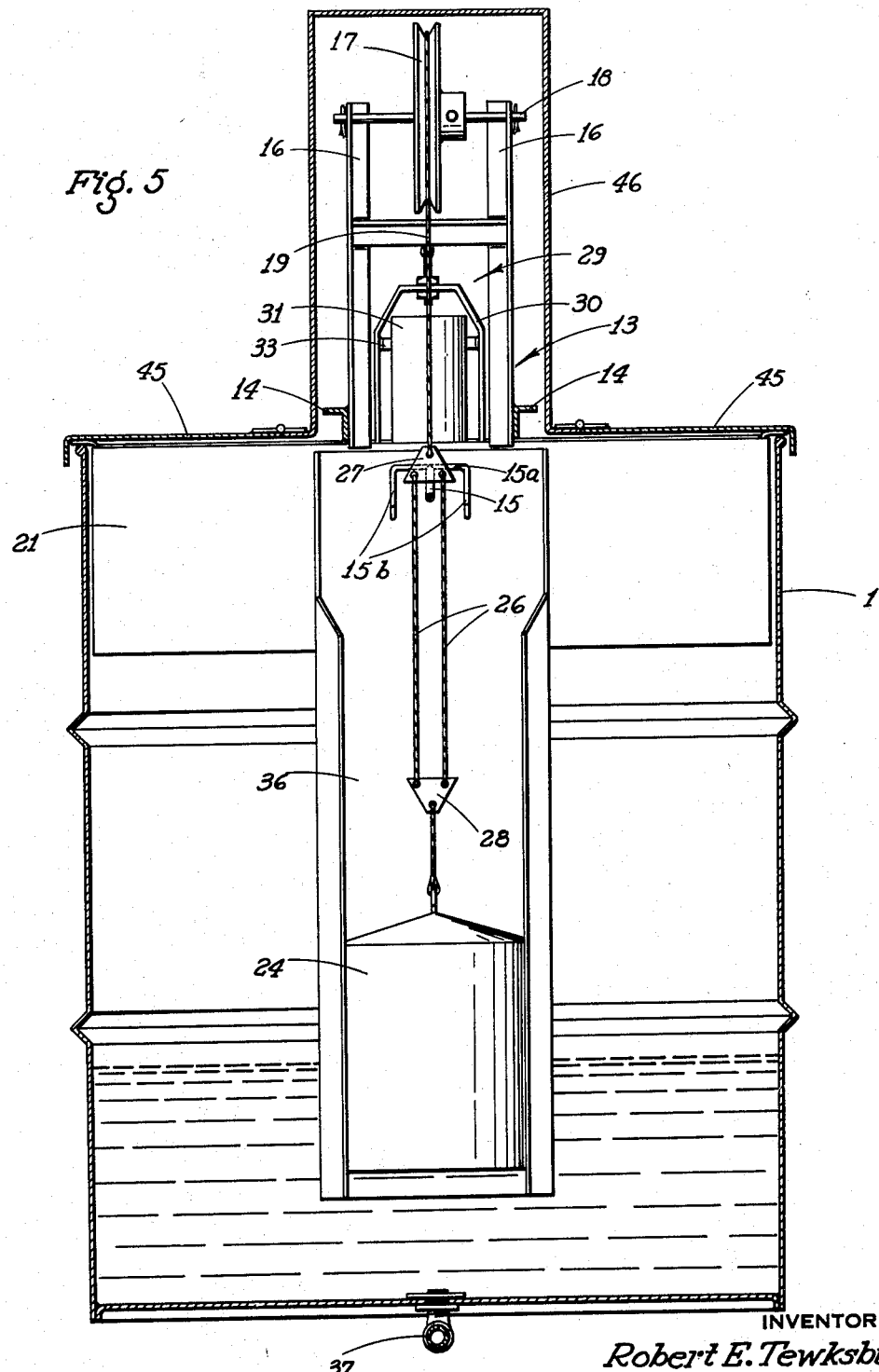
Fig. 5 is a transverse sectional elevation on line 5—5 of Fig. 4.

Referring now more particularly to the drawings, and to the characters of reference marked thereon, the apparatus, which embodies the present invention, is adapted for use on a cylindrical tank or barrel 1, which is initially open at the top. A water supply valve 2 is disposed at the top of the tank 1 adjacent one side thereof; the valve 2 being connected to a water inlet pipe 3, and includes a dependent spout 4 disposed to discharge water into the tank 1 when said valve is open. The valve is opened and closed by a longitudinally movable valve control cap 5 disposed at the inner end of said valve, and which cap is movable to and fro generally radially of the tank 1.

Movement of the cap 5 radially inwardly of the tank 1 opens the valve 2, while radial outward movement of said cap closes the valve. The valve control cap 5 is adapted to be moved between valve opening and valve closing positions by a snap-action mechanism, indicated generally at 6; such mechanism including a snap-action pendulum 7 pivoted, as at 8, in connection with and depending below the body of the valve 2, and link means 9 pivotally connected between the cap 5 and a pivot point 10 on the upper portion of the snap-action pendulum 7 above the pivot 8.

Upstanding tension spring means 11 connect between the snap-action pendulum 7 below the pivot 8 and a fixed arch 12. Upon inward snap-action of the pendulum 7, and at which time the tension spring means 11 pass dead-center in an inward direction (see Fig. 2), the cap 5 is moved in a direction to close the valve 2; such spring means then maintaining the parts in said valve closing position. When the snap-action pendulum 7 is swung outwardly, the tension spring means 11 pass into the opposite dead-center position, holding the pendulum 7 in an outward position, with the valve 2 open (see Fig. 4).

An open, horizontal supporting frame 13 rests on the tank 1 at the top and spans between opposite sides thereof; such supporting frame 13 including parallel, transversely spaced side bars 14. The water supply valve 2 and the rigid arch 12 which spans over said valve are fixed in connection with the frame 13 at one end thereof.

Snap-action of the pendulum 7 between valve closing and valve opening positions is caused by means of a trigger rod 15 fixed to the pendulum 7 and projecting inwardly toward the center of the tank 1. This trigger rod 15 is actuated up or down in the manner as will hereinafter appear.

Substantially centrally of the ends thereof the frame 13 is fitted with transversely spaced upstanding posts 16 fixed at their lower end portions to the side bars 14.

A pulley 17 is carried centrally between the upper portions of the posts 16 on a cross shaft 18 turnably mounted in connection with said posts.

A relatively light weight, very flexible cable 19 turns over the pulley 17, one reach of said cable extending downwardly into the tank 1, while the other reach of said cable extends downwardly in a direction to enter a substantially half circle reservoir 20 supported in the tank 1 on the side opposite the valve 2; such reservoir 20 including an inner wall 21 which extends from side to side of the tank 1 in generally the vertical transverse plane of the posts 16. The reservoir 20 is formed with a well 22 which depends some distance below the bottom 23 of said reservoir; the latter being defined on the inner side by the wall 21.

The reach of the cable 19 which depends into the tank 1 is connected, at its lower end, to a closed cylindrical float 24 which carries therein a quantity of ballast 25, which may be sand or the like.

Intermediate the pulley 17 and the closed cylindrical float 24 the corresponding reach of the cable 19 has interposed therein a section which comprises parallel, transversely spaced cable lengths 26 connected together at the top by an upper spreader and trip plate 27, and connected together at the bottom by a lower spreader and trip plate 28.

The trigger rod 15 projects between the cable lengths 26, and when the float 24 moves towards its raised position, as in Fig. 2, the lower spreader and trip plate 28 urges the trigger rod 15 upwardly until the snap-action pendulum 7 swings inwardly beyond dead-center, whereby the valve 2 is closed.

Similarly, when the float 24 moves towards its lowermost position, as in Fig. 4, the upper spreader and trip plate 27 urges the trigger rod 15 downwardly, whereby the snap-action pendulum 7 moves outwardly beyond dead-center, opening the valve 2.

Thus, each time the float 24 reaches a lowermost position, as in Fig. 4, the valve 2 is opened, remaining so until a predetermined quantity of water is filled into the tank 1, whereupon said valve is closed; there thus being an automatic cycle provided for the recurrent replacement of the water, in predetermined quantity, in tank 1.

In order to prevent the trigger rod 15 from accidentally escaping from between the cable links 26, said trigger rod is formed, at its free end, with a cross rod 15a which is longer than the spacing of the cable lengths 26; said cross rod 15a having dependent legs 15b disposed laterally out from the corresponding cable lengths 26.

The reach of the cable 19 which depends in the direction of the reservoir 20 is connected, at its lower end, to an elevating bucket device, indicated generally at 29; such device comprising an inverted, generally U-shaped bail 30 which normally straddles an upstanding cylindrical can or bucket 31 of relatively small dimensions.

The bucket 31 is fixed at its lower end to a cross shaft 32 journaled in connection with and spanning between the lower ends of the legs of the bail 30; the cross shaft being offset, on the bottom of the bucket 31, in the direction of the vertical transverse plane of the posts 16.

With this arrangement the bucket 31—when upstanding—tends to swing outwardly because of the offset relationship of the cross shaft 32, but such outward swinging is prevented by means of a horizontal yoke 33 secured to, and projecting outwardly from, the legs of the bail 30 intermediate the ends thereof. Thus, the bucket 31 normally upstands in the bail 30, resting outwardly in the yoke 33. In order to assure that the bucket normally remains in this position it is formed in the bottom thereof with an in-place ballast 34.

Vertical travel of the bail 30 is guided by reason of projecting end portions of the cross shaft 32 riding in guide channels 35 which depend into the reservoir 20, including the well 22, from the side bars 14.

When the float 24 is in raised position, as in Fig. 2 (said float in its vertical motion being carried in a guide 36), the elevating bucket device 29 is in lowered position in the reservoir 20, depending to a substantial extent into the well 22. The reservoir 20 contains a quantity of the initially separate liquid which is to be introduced in a measured amount into each filling of water in the tank 1. When the elevating bucket device 29 is in its lowered position in the reservoir 20, the bucket 31 fills with such liquid.

Thereafter, as the float 24 lowers in the tank 1, upon withdrawal of water from the latter through a bottom outlet pipe 37, the elevating bucket device gradually moves upwardly, being guided by the channels 35. The exact amount of the liquid from the reservoir 20 picked up in the bucket 31 is regulated by a vertical row of bleed holes 38 in the outer side of said bucket; all but a selected one of the holes being plugged by removable bolts 39. Thus, any one of the vertically spaced holes can be left open for the purpose of establishing a predetermined level in the bucket 31 with each filling thereof.

As the float 24 reaches its bottom-most position, an inwardly projecting catch finger 40 on the bottom of the bucket 31 engages a hook 41 on the upper edge of the inner wall 21, so that final upward motion of the elevating bucket device 29 results in the bucket 31 being tripped, and thence tipping in the direction of the valve 2. In this way the contents of the bucket 31 discharge into the tank 1 each time that the float 24 reaches its lowermost position.

Such tipping of the bucket 31 is aided by weighting the discharge lip portion of said bucket, as at 42.

Substantially simultaneously with the float 24 reaching its lowermost position, with resulting tipping and emptying of the bucket 31 into tank 1, the upper spreader and trip plate 27 depresses the trigger rod 15, causing snap-action of the pendulum 7 to a valve opening position. Therefore, at substantially the same time that the separate liquid in a measured amount is discharged from the bucket 31 into the tank 1, the valve 2 is opened and the next filling of water begins to enter said tank; the agitation of the water entering the tank from the valve discharge spout 4 assuring of complete mixture, with the water in the tank, of the separate liquid discharged from the bucket 31.

After each tipping of the bucket 31 to discharge into the tank 1, said bucket—upon initial downward travel of the elevating bucket device 29 from its raised position—rocks on the upper edge of the inner wall 21 and is thus returned to its normal upstanding position in the bail 30 resting against the yoke 33.

In order to avoid the necessity of very close adjustment or setting of the working parts which control the opening of the valve 2 at the same time that the bucket 31 dumps, the snap-action pendulum 7 is fitted, by means of a bracket 43, with a somewhat scoop-shaped catch cup 44 which opens upwardly and projects in the direction of the adjacent reach of the cable 19. The catch cup 44 is disposed, when the valve 2 is closed, in a position to receive a quantity of the separate liquid discharged from the bucket 31 upon dumping of the latter (see Figs. 2 and 4).

Each time that the bucket 31 dumps, a quantity of the liquid therefrom falls into the catch cup 44, and the weight of such liquid in said catch cup assures that the snap-action pendulum 7 will swing outward to open the valve, with slight downward pressure on the trigger rod by the upper spreader and trip plate 27. The liquid which is discharged into the catch cup 44, as above, is retained therein only for a short time; this for the reason that said catch cup is formed in the bottom with a drain hole 44 which soon permits the liquid to escape and deliver into the tank 1.

With the described proportioner, the mechanism thereof works positively and effectively in a recurrent cycle, and wholly automatically, for the accomplishment of the intended purpose; to-wit, the admixture in each filling of water in the tank 1 of a measured amount of an initially separate liquid, such as a water sanitizing concentrate, or a medicinal liquid.

In order to normally maintain the initially open-topped tank 1 closed against the entry of foreign substances thereinto, while at the same time protecting the mechanism of the proportioner, said tank is fitted at the top with a hinged lid assembly 45 which includes, centrally and radially thereof, an upstanding semi-circular hood 46 which spans over that part of the proportioner mechanism which projects above the supporting frame 13.

The reservoir 20 may be continuously supplied with liquid, as by means of a float-controlled feed pipe and valve unit leading from a source of supply, but for my particular purpose, such a small amount of liquid is drawn from the reservoir with each filling of the much larger tank that a single filling of the reservoir is adequate for a considerable period of use of the apparatus.

When the apparatus is used for the treatment of the drinking water of poultry, and for which such apparatus is especially designed, it is possible to control or regulate, within reasonably close limits and with substantially constant proportioning, the amount of an initially separate liquid introduced into the water for the purpose of sanitation, or for medicinal effect.

From the foregoing description it will be readily seen that there has been set forth such an apparatus as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A proportioner, for producing a mixture of water in predetermined quantity and an initially separate liquid in a measured amount, comprising a water tank, means to introduce water into the tank in said quantity, means to withdraw said quantity of water from the tank, a reservoir for said separate liquid disposed adjacent the water tank, an elevating bucket device adapted to contain said measured amount of the separate liquid, means suspending said elevating bucket device for movement between a lowered filling position in the separate liquid in the reservoir and a raised emptying position discharging into the tank, and a float in the tank connected with said suspending means and operative to cause movement of the elevating bucket device between said lowered and raised positions thereof; said means to introduce water into the tank including a valve, and means to open and close the valve responsive to movement of and only when the float reaches fully lowered and raised positions.

2. A proportioner, as in claim 1, in which said suspending means includes a vertically movable element above and to which the float is connected, the valve including a trigger arm projecting to adjacent said movable element, and vertically spaced upper and lower trip members on said movable element adapted to engage and move the trigger arm downward or upward upon lowering or raising, respectively, of said movable element; downward movement of the trigger arm opening the valve and upward movement of said arm closing the valve.

3. A proportioner, as in claim 2, in which said movable element is a depending cable reach, the latter including a pair of parallel, transversely spaced cable lengths intermediate its ends, and said trip members being upper and lower spreader and trip plates connecting said lengths in the cable reach; the trigger rod projecting between said cable lengths.

4. A proportioner, for producing a mixture of water in predetermined quantity and an initially separate liquid in a measured amount, comprising a water tank, means to introduce water into the tank in said quantity, means to withdraw said quantity of water from the tank, a reservoir for said separate liquid disposed adjacent the water tank, an elevating bucket device adapted to contain said measured amount of the separate liquid, means suspending said elevating bucket device for movement between a lowered filling position in the separate liquid in the reservoir and a raised position for emptying into the tank, said device including a normally upstanding but tippable bucket, means other than the liquid to tip the bucket in a direction to discharge the liquid therefrom into the tank when said device reaches its raised position, and a float in the tank connected with said suspending means and operative to cause movement of the elevating bucket device between said lowered and raised positions thereof.

5. A proportioner, as in claim 4, in which said bucket tipping means includes a catch finger projecting from the bucket, and a fixed hook disposed for engagement by said finger upon the elevating bucket device closely approaching its raised position.

6. A proportioner, for producing a mixture of water in predetermined quantity and an initially separate liquid in a measured amount, comprising a water tank, means to introduce water into the tank in said quantity, means to withdraw said quantity of water from the tank, a reservoir for said separate liquid disposed adjacent the water tank, the tank and reservoir having a wall therebetween, a post structure upstanding above and adjacent the wall, a horizontal axis pulley journaled in connection with the post structure, a cable turning over the pulley, the cable including one reach depending toward the reservoir and another reach depending into the tank, a normally upstanding but tippable bucket suspended from said one reach for movement thereby from a lowered filling position in the reservoir and a raised position for tipping over said wall to discharge into the tank, a float suspended in the tank from said other reach whereby vertical motion of the float in each direction is translated by said cable and pulley to corresponding but opposed motion of the bucket, and means to so trip the bucket when the same moves to said raised position.

7. A proportioner, for producing a mixture of water in predetermined quantity and an initially separate liquid in a measured amount, comprising a water tank, means to introduce water into the tank in said quantity, means to withdraw said quantity of water from the tank, a reservoir for said separate liquid mounted in the tank adjacent the top and at one side thereof, said reservoir including a wall extending in the tank between the sides thereof, a horizontal frame spanning between the sides of the tank at the top thereof and above the reservoir, a post structure upstanding from the frame adjacent said wall, a horizontal axis pulley journaled in connection with the post structure, a cable turning over the pulley, the cable including one reach depending toward the reservoir and another reach depending into the tank, a normally upstanding but tippable bucket suspended from said one reach for movement thereby from a lowered filling position in the separate liquid in the reservoir and a raised position for tipping over said wall to discharge into the tank, a float suspended in the tank from said other reach whereby vertical motion of the float in each direction is translated by said cable and pulley to corresponding but opposed motion of the bucket, and means to so trip the bucket when the same moves to said raised position.

8. A proportioner, as in claim 7, including vertical guide means for the bucket, extending from the frame into said reservoir.

9. A proportioner, for producing a mixture of water in predetermined quantity and an initially separate liquid in a measured amount, comprising a water tank, means to introduce water into the tank in said quantity, means to withdraw said quantity of water from the tank, a reservoir for said separate liquid mounted in the tank adjacent the top and at one side thereof, said reservoir including a wall extending in the tank between the sides thereof, a horizontal frame spanning between the sides of the tank at the top thereof and above the reservoir, a post structure upstanding from the frame adjacent said wall, a horizontal axis pulley journaled in connection with the post structure, a cable turning over the pulley, the cable including one reach depending toward the reservoir and another reach depending into the tank, an elevating bucket device suspended from said one reach for movement thereby from a lowered filling position in the reservoir and a raised emptying position for discharge over the wall into the tank, said device comprising a bail, a normally upstanding bucket pivoted in the bail for tipping in a direction for such discharge, and means normally preventing such tipping of the bucket; a float suspended in the tank from said other reach whereby vertical motion of the float in each direction is translated by said cable and pulley to corresponding but opposed motion of the elevating bucket device, and means to so tip the bucket when the elevating bucket device moves to said raised position.

10. A proportioner, for producing a mixture of water in predetermined quantity and an initially separate liquid in a measured amount, comprising a water tank, means to introduce water into the tank in said quantity, said means including a valve having a movable control member projecting in the tank for up and down movement, upward movement of said member closing the valve while downward movement opens the same, means to withdraw said quantity of water from the tank, a reservoir for said separate liquid disposed adjacent the water tank, an elevating bucket device adapted to contain said measured amount of the separate liquid, means suspending said elevating bucket device for movement between a lowered filling position in the separate liquid in the reservoir and a raised emptying position discharging into the tank, a float in the tank connected with said suspending means and operative to cause movement of the elevating bucket device between said lowered and raised positions thereof, and means arranged with said suspending means operative to cause upward and downward movement of said control member upon the float moving to raised or lowered positions in the tank.

11. A proportioner, as in claim 10, including a normally empty catch cup fixed in connection with said movable control member and disposed to receive a portion of the separate liquid discharged into the tank by said elevating bucket device, and said cup having a restricted drain hole in the bottom thereof.

12. A proportioner, for producing a mixture of water in predetermined quantity and an initially separate liquid in a measured amount, comprising a water tank, means to introduce water into the tank in said quantity, said means including a valve having a movable control member projecting in the tank for up and down movement, snap-action mechanism associated with said control member to yieldably hold the same in a raised or lowered position, the valve being closed in the raised position and open in the lowered position of said member, means to withdraw said quantity of water from the tank, a reservoir for said separate liquid disposed adjacent the water tank, an elevating bucket device adapted to contain said measured amount of the separate liquid, means suspending said elevating bucket device for movement between a lowered filling position in the separate liquid in the reservoir and a raised emptying position discharging into the tank, a float in the tank connected with said suspending means and operative to cause movement of the elevating bucket device between said lowered and raised positions thereof, and means arranged with said suspending means operative to cause snap-action of the control member to raised or lowered position upon the float moving to a corresponding position in the tank.

13. A device, as in claim 1, in which the tank is open at its upper end and the reservoir is disposed in the upper portion of the tank and extends from adjacent one side thereof to a point short of the opposite side of said tank; and a frame resting on top of the tank and on which said reservoir, the bucket device, suspension means, and water introducing means are mounted.

14. A device, as in claim 4, in which the bucket suspension means is arranged so that the bucket will be raised entirely clear of the liquid before being tipped to a discharge position; said bucket being provided with a plurality of vertically spaced drain holes in its side, and removable plug means for any selected number of such holes.

15. A device, as in claim 4, with a relatively small well formed in the bottom of the reservoir to receive the bucket for substantially its full height for filling of said bucket.

References Cited in the file of this patent

UNITED STATES PATENTS

| | | |
|---|---|---|
| 885,828 | Bartlett | Apr. 28, 1908 |
| 926,842 | Bartlett | July 6, 1909 |
| 998,317 | Winckler | July 18, 1911 |
| 1,133,092 | Buckley | Mar. 23, 1915 |
| 1,575,433 | Lichtenthaeler | Mar. 21, 1926 |